United States Patent Office 2,815,735
Patented Dec. 10, 1957

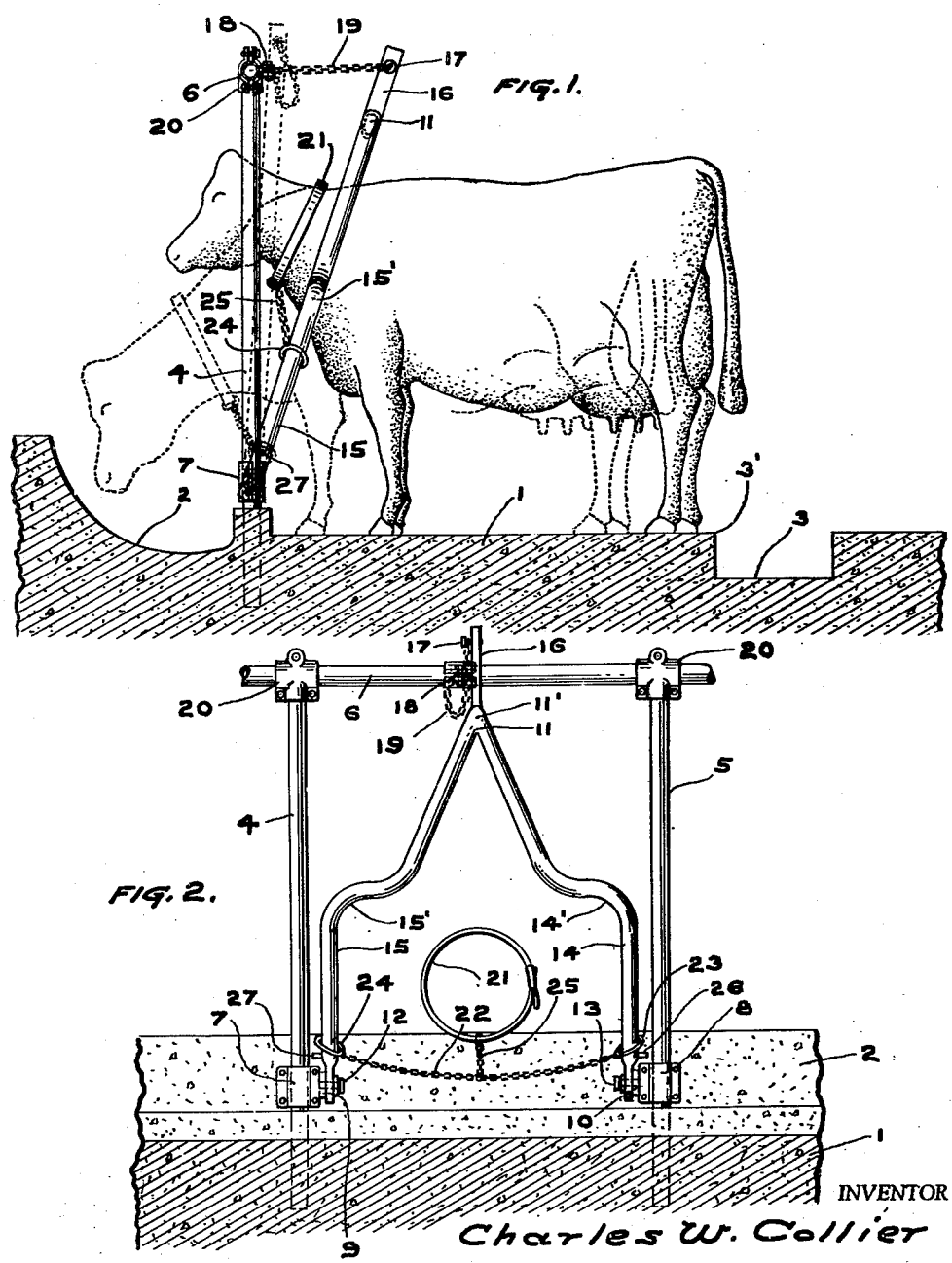

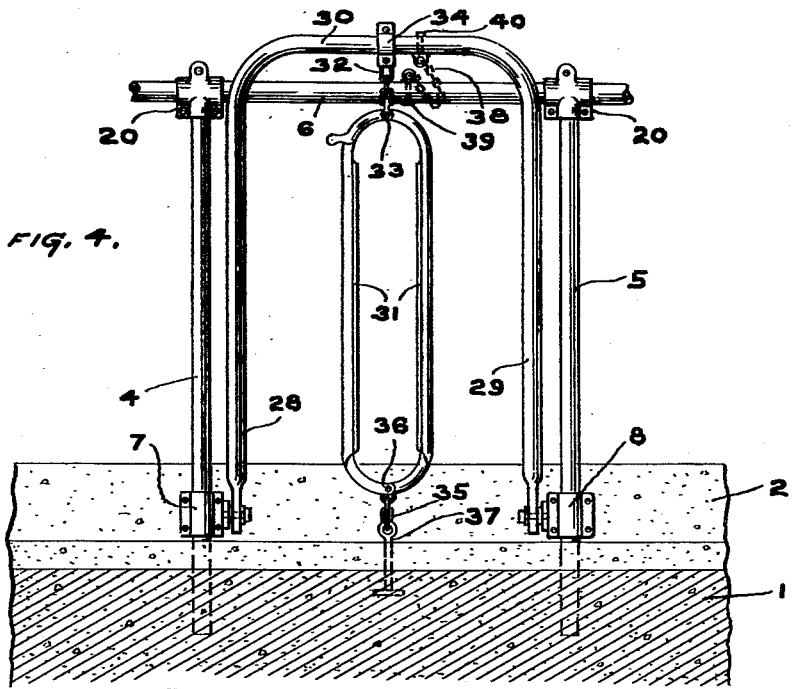
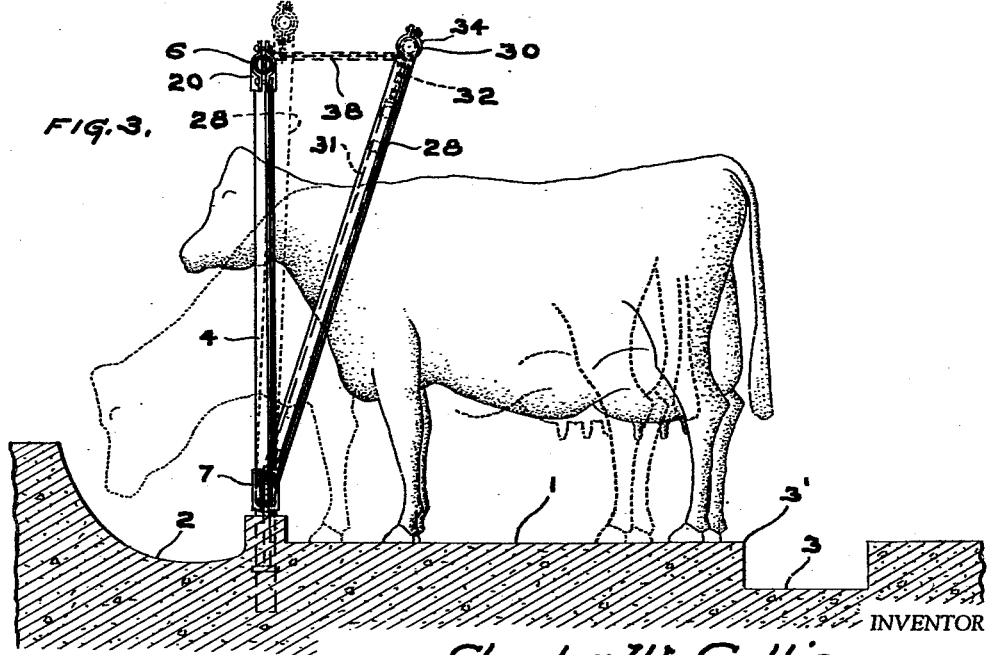

2,815,735

COW STANCHION

Charles W. Collier, Darlington, Md.

Application June 4, 1956, Serial No. 589,205

6 Claims. (Cl. 119—147)

This invention relates to improvements in stalls for use in dairy barns, and more particularly to an improved cow stall installation adapted to maintaining a cow in multiple positions in her stall, for the respective activities of eating, standing and lying down.

The main object of the invention is to provide a stall platform of such depth that the animal will have space to move forward on the platform when lying down to a point where her udder rests upon the platform, which protects it from injury on the corner of the manure trench.

A further object of the invention is to provide means whereby the cow is allowed, when standing, to step forward to a position where she can reach all of her feed in the feed trough, but when she has finished eating to urge her to step backward to a position in which her excretions will fall in the trench rather than on the platform.

A further object of the invention is to provide a hinged frame which may be moved toward the feed trough when the shoulders of the cow move forward as she gets up from the platform or lies down on the platform.

Further objects and advantages of the invention will become more apparent as the nature of the invention is more fully disclosed and as described in the following description and shown in the accompanying drawings forming a part hereof, and in which:

Figure 1 is a side elevational view of the improved stall illustrating an animal positioned therein.

Figure 2 is a front elevational view of the stall.

Figure 3 is a side elevational view of a modified form of stall also showing an animal positioned therein.

Figure 4 is a front elevational view of the stall shown in Figure 3.

In referring to the drawings like reference numerals are used to point out like parts throughout the several views.

The stall is usually constructed of a concrete base having a platform area 1, upon which the animal normally stands, a feed trough 2 formed along what will be referred to as the front edge of the platform and a manure trench 3, sometimes referred to as a ditch, or gutter along the rear edge of the platform.

The preferred form of the stall is illustrated in Figures 1 and 2. Fixedly secured into the concrete between the platform area and the feed trough are uprights 4 and 5. Across the upper ends of these uprights is a cross-bar 6. Any number of these stalls are constructed usually side by side for a desired distance, the platform being continuous and common to all the stalls throughout the area. Adjacent the lower ends of the upright members or posts 4 and 5 and above the surface of the concrete are clamps 7 and 8. These clamps carry projections 9 and 10 on their inner sides for hingedly supporting an inverted V-shaped member 11 and it is held supported on the projections 9 and 10 by the studs 12 and 13. The lower portions 14 and 15 of the V-shaped member extend normally upwardly and are substantially parallel to the points 14' and 15' when they are bent inwardly toward each other for a short distance where they again move upwardly this time to a point 11' to form a very definite V design in the upper half of this hinged member 11. Extending upwardly from the upper point 11' of the member 11 and fixedly united therewith is a bar 16 of such length as to contact the cross-bar 6 to limit the forward movement of the V-shaped hinged member 11 to a perpendicular position. This bar is provided with a screw 17 adjacent its vertical center. Adjacent the center of the uprights 4 and 5 and secured to the cross-bar 6 is a clamp 18. Secured to the screw 17 and the clamp 18, is a short flexible tie member, or chain 19. This chain 19 is of such length as to allow a limited movement of the hinged frame rearwardly from its vertical position.

The cross-bar 6 may be attached to the upright members 4 and 5 in any convenient form. For illustration, the uprights and cross-bar are shown rigidly secured to each other by the clamps 20. However, any suitable means may be used such as threading, or by welding.

For attaching the animal to the stall there is provided a suitable collar 21. Extending between the portions 14 and 15 of the hinged member 11 is a flexible member in the form of a chain 22 slidably attached to the upright portions 14 and 15 of the hinged member 11 by two rings 23 and 24. The collar 21 is connected with the chain 22 by a short tie member 25. It can be readily seen by this construction, that when the collar is moved upwardly the rings 23 and 24 will slide up the vertical portions 14 and 15 of the hinged member. And when the collar is lowered, the chain 22 including the rings will slide down the portions 14 and 15 until they come in contact with the pins 26 and 27 carried adjacent the lower ends of the portions 14 and 15. Hinging member 11 low, toward the platform, gives the member more back thrust against the shoulders of the cow, than were it hinged higher up on the posts, when it is overbalanced toward the trench. The vertical portions 14 and 15 give the cow a freedom of lateral movement in lying down, and promote rest.

A modified form of stall is shown in Figures 3 and 4. However, the platform feed trough, trench, the upright members or posts, 4 and 5 and the cross-bar are identical with those first described for the preferred form. The difference lies in the hinged member and the animal holding means. The hinged member in this modification is an inverted U-shaped frame having parallel side portions 28 and 29 and a closed upper end portion 30. The free lower ends of the side portions 28 and 29 are hinged to the members 7 and 8 as described for the preferred form. Through the center of the U frame is supported a conventional stanchion 31. The upper end of the stanchion is supported preferably by a chain of few links 32, which has one end connected with the stanchion by a suitable pin 33 and which is connected at its other end to the center of the portion 30 of the hinged member by a clamp 34. The bottom of the stanchion is held by a similar chain 35 having one end connected with the stanchion by a suitable pin 36 and its opposite end connected with an eye bolt 37 buried into the concrete centrally between the upright members 4 and 5.

The U-shaped frame extends slightly above the crossbar 6 and prevents the frame from moving past a vertical position having somewhat the function of the bar 16 shown in Figures 1 and 2. There is provided a chain 38, or other suitable means, for limiting the movement of the hinged frame rearwardly toward the rear of the platform.

The chain has one of its ends attached to the crossbar 6 by a clamp 39 and its opposite end attached to the portion 30 of the hinged frame member by an eye bolt 40.

The platform is constructed approximately twelve inches wider from the base of the animal holding assembly to the trench than the animal is long in order that the animal may have more room to lie down with comfort and upon suitable bedding and without having her rear feet and udder extending over into the trench.

The operation of the invention is very simple and practical and in regard to the first or the preferred form shown in Figures 1 and 2, the hinged V frame is normally in the position as shown in full lines in Figure 1, that is, extending rearwardly at an angle limited by the length of the chain 19 when the animal is standing normally with her head up. In this position the animal is encouraged to step back by the pressure of the hinged V member on her neck and in this position the animal will drop her excretions into the trench 3. When the animal steps forward to eat out of the feed trough she normally takes the position as shown by the dotted lines. Also as the animal presses forwardly the V frame will be pressed forward until the member 16 comes in contact with the crossbar 6. When the animal has finished her food and raised her head, the weight of the V frame against the animal's shoulders will again normally cause her to move back until she is free from this pressure against her shoulders, which as previously stated puts the animal in proper relation with the trench into which any excretions may drop and which mostly occurs when the animal relaxes. The V member 11 is always slightly overbalanced toward the trench.

When the cow desires to lie down her first step will be to drop to her front knees, which moves her head and shoulders down first and also there is the tendency for her to move forwardly, if she has the room to do so. By having the V frame wide adjacent the platform and movable by pressure by the cow's shoulders the cow's shoulders are allowed to move forward and she will lie much nearer the front of the stall than she could with the conventional rigid stanchion, therefore, the complete body of the cow including her udder and rear legs would be forward of the trench where an adequate layer of bedding can be maintained.

It has been one of the handicaps of the conventional type of stall, that when the animal lies down the rear legs and udder in many instances extend over the front edge 3' of the trench 3, which is usually constructed of rigid material, she injures her udder and teats by stepping on them when she rises from the lying position. A cow gets up in reverse from the way the lies down, that is, she gets up on her back legs first. This stall allows the animal to remain forward on the platform, at least until she gets up on her front legs. By having an arrangement by which the cow is prevented from injury to her udder and teats, her productivity of milk is increased, also injury to the udder and teats sometimes results in veterinarian treatment and possibly disposing of the animal altogether.

There is also the consideration of the comfort of the cow outside of the injuries she may receive, in the form of proper bedding space, freedom in feeding, reasonable space in which to move her head and shoulders when lying down, all of which increase her milk productivity.

Many experiments have been conducted both by the United States and State government universities which definitely show that the production of a dairy cow is in a substantial measure dependent on maintaining the comfort and relaxation of the animal. These experiments have also shown that giving the cow freedom and comfort and eliminating the trench hazard will cause milk production increased by 2 to 12 pounds daily with no cases of mastitis occurring, and in comfortable stalls cows lie down 1.4 hours per day more than cows in conventional stalls.

Prior to the use of this invention, the consumption of teat dilators for injured teats was at the rate of five hundred and thirteen per hundred cows per year. Subsequent to the trial use of this invention, the use of dilators was cut to fifty-two per hundred cows per year, indicating a reduction in number and persistence of teat injuries of 89.9% as compared to those prevalent with conventional stanchions.

In the period prior to the experimental use of this invention, clinical cases of udder mastitis were incurred at the rate of one hundred and thirty-nine per hundred cows per year. Subsequent to the experimental use of this invention and after the passage of sufficient time for the curing of infections clinically present or latent when the invention was first experimentally applied, clinical mastitis has been at the rate of thirty-seven per hundred cows per year, indicating a reduction of 65% in mastitic infections.

While only two forms of the present stall have been illustrated and described, other forms could be made and the present disclosure is not intended as a limitation in any way, as the scope of the invention is best defined in the appended claims.

What is claimed as new and is desired to be secured by Letters Patent is:

1. An animal stall construction comprising a platform, a feed trough extending across the front of the platform and a trench extending across the rear of the platform, an upstanding free swinging hinged frame overbalanced toward the trench and adapted to extend on both sides of an animal's neck and to swing for a predetermined distance backward and forward of the platform, including means to bear upon the shoulders of the animal when standing and to retain the animal in shoulder bearing relation to the bearing means, the bearing means gently urging the animal rearwardly toward the trench because of the overbalance of the hinged frame, the frame having a lower end hinged at a point adjacent the front edge of the platform, means for preventing the hinged frame from moving to an overbalanced position toward the feed trough and a flexible tie member for limiting the movement of the hinged frame toward the trench.

2. An animal stall as set forth in claim 1 including vertically movable means carried by the hinged frame for engaging the neck of the animal, moving from animal lying to standing positions and limiting forward, backward and sidewise movement of the animal on the platform.

3. In an animal stall as set forth in claim 1 in which the upper portion of the hinged frame is in the form of an inverted V and the lower portion has a pair of vertical side members substantially parallel to each other, a ring slidable vertically along each of the side members, flexible connecting means between the two ring members and an animal neck collar secured centrally of the flexible ring connecting member.

4. In an animal stall as set forth in claim 1 in which the hinged frame is in the form of an inverted U, a stanchion having its upper end flexibly secured to the center of the said hinged frame and a flexible connection between the lower end of the stanchion and the platform centrally of and in line with the sides of the hinged frame.

5. In an animal stall as set forth in claim 1 in which the hinged frame is hingedly connected to a pair of fixed uprights vertically beside which the said lower end of the hinged frame extends, a fixed cross-bar extending horizontally adjacent the upper end of the hinged frame and being located to form a stop for the hinged frame when it has nearly reached its vertical position in moving toward the trough.

6. In an animal stall as set forth in claim 1, in which the upper portion of the hinged frame is in the form of an inverted V and the lower portion has a pair of vertical side members substantially parallel to each other, flexible means connected to the side members and having connected centrally thereto an animal neck collar, the flexible means securing the collar substantially centrally between said side members.

References Cited in the file of this patent

UNITED STATES PATENTS

| | | |
|---|---|---|
| 1,949,189 | Smith | Feb. 27, 1934 |
| 2,578,093 | Schillinger | Dec. 11, 1951 |
| 2,648,308 | Ogden | Aug. 11, 1953 |

FOREIGN PATENTS

| | | |
|---|---|---|
| 579,053 | Germany | June 21, 1933 |